US007664807B2

(12) United States Patent
Luzzi et al.

(10) Patent No.: US 7,664,807 B2
(45) Date of Patent: Feb. 16, 2010

(54) APPARATUS FOR PROVIDING A RANDOM BIT STREAM

(75) Inventors: Raimondo Luzzi, Graz (AT); Marco Bucci, Graz (AT); Holger Bock, Graz (AT); Werner Drexel, Heiligenkreuz A W. (AT)

(73) Assignee: Infineon Technologies AG (DE)

( * ) Notice: Subject to any disclaimer, the term of this patent is extended or adjusted under 35 U.S.C. 154(b) by 748 days.

(21) Appl. No.: 11/459,096

(22) Filed: Jul. 21, 2006

(65) Prior Publication Data

US 2007/0043797 A1 Feb. 22, 2007

Related U.S. Application Data

(63) Continuation of application No. PCT/EP2005/000926, filed on Jan. 31, 2005.

(30) Foreign Application Priority Data

Feb. 4, 2004 (EP) .................... 04002484

(51) Int. Cl.
*G06F 1/02* (2006.01)
(52) U.S. Cl. ................................... 708/250
(58) Field of Classification Search ........... None
See application file for complete search history.

(56) References Cited

U.S. PATENT DOCUMENTS 4,355,366 A * 10/1982 Porter .................. 708/255
6,362,695 B1 3/2002 Beiley et al.

6,631,390 B1 10/2003 Epstein
6,667,665 B2 * 12/2003 Janssen .................. 331/78
7,193,481 B2 * 3/2007 Luzzi .................... 331/78

FOREIGN PATENT DOCUMENTS

WO    WO-03/081417 A2    10/2003

OTHER PUBLICATIONS

W. Timothy Holman et al.; "An Integrated Analog/Digital Random Noise Source"; IEEE Transactions on Circuits and Systems- I: Fundamental Theory and Applications, vol. 44, No. 6, Jun. 1997, pp. 521-528.
M. Bucci et al.; "A High Speed Truly IC Random Number Source for Smart Card Microcontrollers"; Proc. 9th IEEE International Conf. on Electronics, Circuits and Systems (ICECS 2002), Sep. 2002, pp. 239-242.
M. Bucci et al.; "A High-Speed IC Random-Number Source for Smart Card Microcontrollers"; IEEE Transactions on Circuits and Systems-I: Fundamental Theory and Applications, vol. 50, No. 11, Nov. 2003, pp. 1377-1380.

(Continued)

*Primary Examiner*—Tan V Mai
(74) *Attorney, Agent, or Firm*—Dickstein, Shapiro, LLP.

(57) ABSTRACT

An apparatus for providing a random bit stream includings a first provider for providing a clock signal, a second provider for providing a sample signal, an activator for activating the first and second providers such that a sampling edge of the sample signal is aligned to an edge of the clock signal. The apparatus further includes a sampler for sampling the clock signal responsive to the sampling edge of the sample signal and for generating a random bit dependent on the sampled state of the clock signal. Further, the apparatus includes a deactivator for deactivating the first and second providers. Successive random bits form a random bit stream.

12 Claims, 7 Drawing Sheets

OTHER PUBLICATIONS

M. Bucci et al.; "A High-Speed Oscillator-Based Truly Random Number Source for Cryptographic Applications on a Smart Card IC"; IEEE Transactions on Computers, vol. 52, No. 4, Apr. 2003, pp. 403-490.

T. Stojanovski et al.; "Chaos-Based Random Number Generators—Part I: Analysis"; IEEE Transactions on Circuits and Systems-I: Fundamental Theory and Applications, vol. 48, No. 3, Mar. 2001, pp. 281-288.

C. S. Petrie et al.; "A Noise-Based IC Random Number Generator for Applications in Cryptograhy"; IEEE Transactions on Circuits and Systems-I: Fundamental Theory and Applications, vol. 47, No. 5, May 2000, pp. 615-621.

V. Bagini et al.; "A Design of Reliable True Random Number Generator for Cryptographic Applications"; Proc. Workshop on Cryptographic Hardware Embedded Systems (CHES 99), Lecture Notes in Computer Science 1717, Springer-Verlag, Heidelberg, Germany, 1999, pp. 204-218.

E. Trichina et al.; "Supplemental Cryptographic Hardware for Smart Cards"; IEEE Micro, vol. 21, No. 6, Nov. 2001, pp. 26-35.

National Institute of Standards and Technology (NIST) Federal Information Processing Standards Publication (FIPS) 140-2, Security Requirements for Cryptographic Modules, May 2001.

T. Stojanovski et al.; "Chaos-Based Random Number Generators—Part II: Practical Realization"; IEEE Transactions on Circuits and Systems-I: Fundamental Theory and Applications, vol. 48, No. 3, Mar. 2001, pp. 382-385.

D.J. Kinniment et al.; "Design of an On-Chip Random Number Generator using Metastability"; Proceedings of the European Solid State Circuits Conference, Sep. 24, 2002, pp. 595-598.

"Integrated Circuit Compatible Random Number Generator"; IBM Technical Disclosure Bulletin, IBM Corp., New York, US., vol. 30, No. 11, Apr. 1988, pp. 333-335.

C. Petrie et al.; "Modeling and Simulation of Oscillator-Based Random Number Generators"; 1996 IEEE International Symposium on Circuits and Systems (ISCAS). Circuits and Systems Connecting the World, Atlanta, May 12-15, 1996, New York, NY, vol. 4, May 12, 1996, pp. 324-327, XP000618584.

* cited by examiner

APPARATUS FOR PROVIDING A RANDOM BIT STREAM

CROSS-REFERENCE TO RELATED APPLICATION

This application is a continuation of copending International Application No. PCT/EP2005/000926, filed Jan. 31, 2005, which designated the United States, and was not published in English and is incorporated herein by reference in its entirety.

BACKGROUND OF THE INVENTION

1. Field of the Invention

The present invention relates to an apparatus for providing random bit stream and, in particular, to an apparatus based on jittered oscillator sampling.

2. Description of Prior Art

Symmetric and asymmetric ciphering algorithms require an availability of a high quality random number source for key generation. Random numbers are also used for generating challenges in authentication protocols, to create padding bytes and blinding values for random masking.

Even if pseudo random number generators (PRNG; PRNG=pseudo random number generator) based on cryptographic secure deterministic algorithms can be employed for these purposes, a physical source of true randomness is needed for algorithm seeding. For this reason, a cryptographic token, like a chip-card, must also feature a true random number generator (RNG; RNG=random number generator) among its peripheral devices.

The main feature of a high-quality randomness source is the unpredictability of the produced bit stream. An observer or even attacker must not be able to carry out any useful prediction about the true RNG output even if the design of the RNG is known.

A true RNG generates a random bit stream from a non-deterministic natural source like an electronic noise or a radioactive decay. Indeed, in an integrated implementation, electronic noise sources like thermal or shot noise are the only stochastic processes that can be exploited.

According to the prior art, three different techniques for generating random bit streams can be considered: Direct amplification of a noise source, jittered oscillator sampling and discrete-time chaotic maps.

The first technique, a direct amplification of a noise source, exploits an amplification of a white noise source which is usually thermal noise from an integrated resistor or a shot noise from active devices. A high-gain amplifier is required to obtain a noise signal whose amplitude is large enough for further processing like a comparison to a voltage reference and sampling. The main issue when designing an amplification-based RNG is an offset voltage after the noise amplifier. An offset much smaller than a noise standard deviation is needed in order to obtain a good quality random bit stream. A noise amplifier bandwidth is also an issue if a fast sampling frequency is required. A further drawback is the presence of an internal disturbance from a power supply, a substrate or a cross-coupling, and an external disturbance whose power level can be higher than the random noise level at the amplifier input, if proper design techniques are not employed. As a consequence, periodic patterns can be forced in the true RNG's output, thus affecting its statistical quality and unpredictability. Periodic patterns are a main concern in a chip-card implementation of a RNG, since no adequate external shielding is usable and the RNG is integrated on a common silicon substrate close to noisy digital circuits. To address the offset problem, in W. T. Holman, J. A. Connelly, and A. B. Downlatabadi, "An integrated analog/digital random noise source", IEEE Trans. Circuits and Syst. I, vol. 44, no 6. pp. 521-528, June 1997 a simple low-pass filter is used to cancel the offset voltage at the amplifier output. The proposed solution requires a chip area which is too large and, moreover, the comparator offset is not removed sufficiently. In M. Bucci, L. Germani, R. Luzzi, P. Tommasino, A. Trifiletti, M. Varanonuovo, "A high speed truly IC random number source for Smart Card microcontrollers", Proc. 9$^{th}$ IEEE International Conf. on Electronics, Circuits and Systems (ICECS 2002), pp. 239-242, Sept. 2002 and M. Bucci, L. Germani, R. Luzzi, P. Tommasino, A. Trifiletti, M. Varanonuovo, "A high speed IC random number source for Smart Card microcontrollers", IEEE Trans. Circuits and Syst. I, vol. 50, no. 11, pp. 1377-1380, Nov 2003, an amplification-based true RNG is reported which features a precise offset zeroing system without employing external components and large capacitors.

A true RNG based on the second technique, the jittered oscillator sampling, basically, includes two free running oscillators and a sampling element like a single D-type flip-flop. An output signal from a slower of the two oscillators samples an output of the faster of the two oscillators, thus generating a bit stream. The resulting bit sequence derives from the oscillators mean frequency ratio and their cycle-to-cycle jitter. Properly chosen frequency ratios lead to bit streams that seem to be more random when statistical randomness tests are applied. Nevertheless, the output bit entropy is due to the oscillator's jitter being the only randomness source in such a system. If the sample signal of the fast oscillator features an unbalanced mean value, this in turn gives rise to an unbalanced mean value on the output bit stream or to an increase in its bit-to-bit correlation, according to the adopted sampling element. Anyway, this is not the main disadvantage to consider. Moreover, periodic disturbances like a system clock can synchronize the sampling oscillator, thus dramatically reducing its jitter. In M. Bucci, L. Germani, R. Luzzi, A. Trifiletti, M. Varanonuovo, "A high-speed oscillator-based truly random number source for Cryptographic Applications on a Smart Card IC", IEEE Trans. Computers, vol. 52, no. 4, pp. 403-490, April 2003 an oscillator-based true RNG is reported where the sampling oscillator features an amplified noise source inside, thus obtaining a very high jitter-to-mean period ratio of about 10%. This increases the random bit stream quality, at the expense of an increase in area and power requirements.

Figure 1:
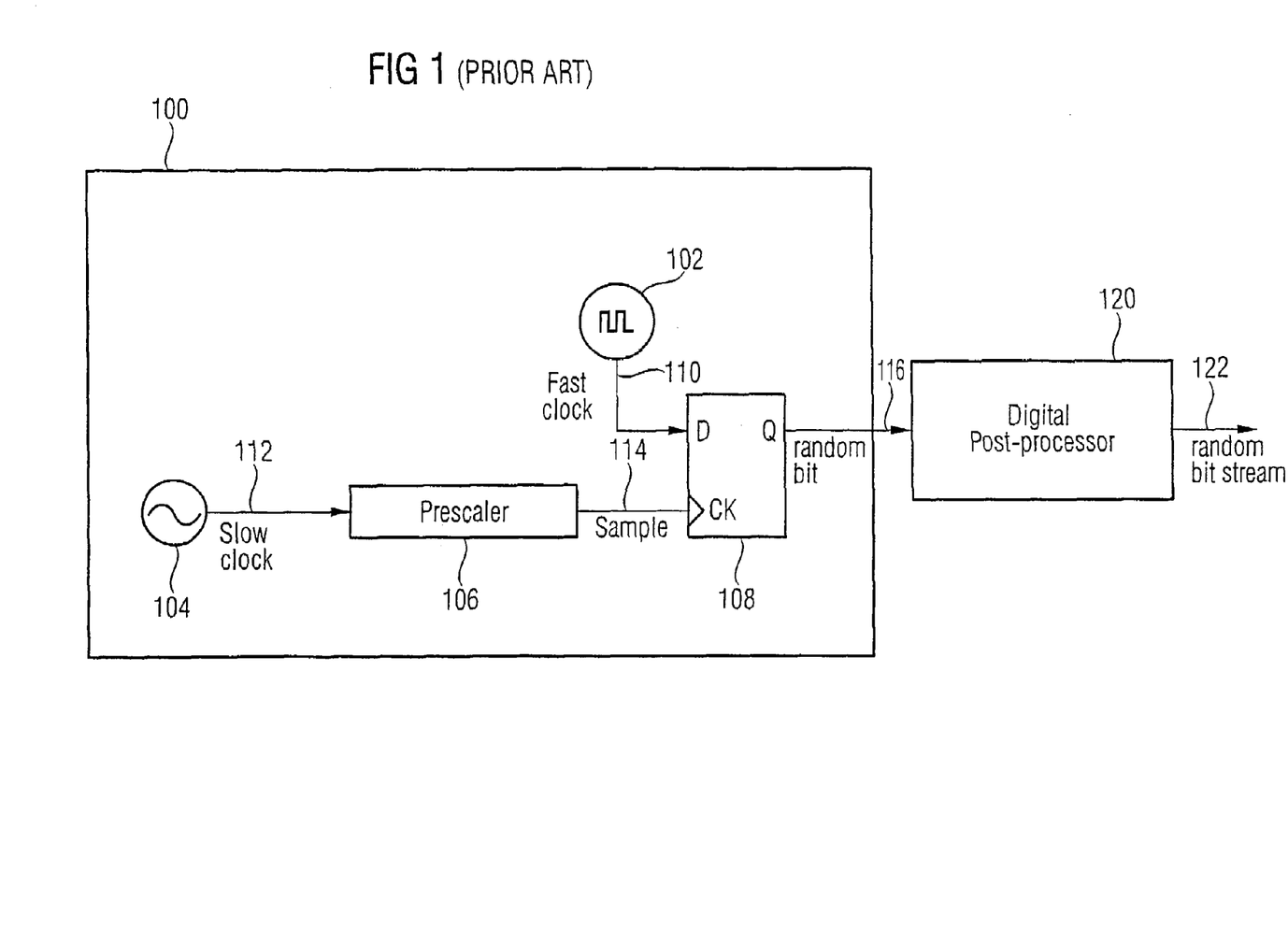
FIG. 1 shows a random number generator source according to the prior art.

FIG. 1 shows a schematic view of a jittered oscillator sampling based RNG according to the prior art. An RNG source 100 comprises a high-frequency oscillator 102, a low-frequency oscillator 104, a prescaler 106 and a sampler 108. The sampler 108 is a D-flip-flop. The high-frequency oscillator 102 generates a fast clock signal 110 which is a data input to the sampler 108. The low-frequency oscillator 104 generates a slow clock signal 112 which is prescaled by the prescaler 106. The prescaler 106 outputs a sample signal 114 which is an input to a clock input of the sampler 108. The sampler 108 samples the fast clock signal 110 on a rising edge of the sample signal 114 and outputs a random bit 116 which depends on a sampling state of the fast clock signal 110 while being sampled. Here, successive random bits 116 are an input to a digital post-processor 120 which outputs a random bit stream 122.

Figure 2:
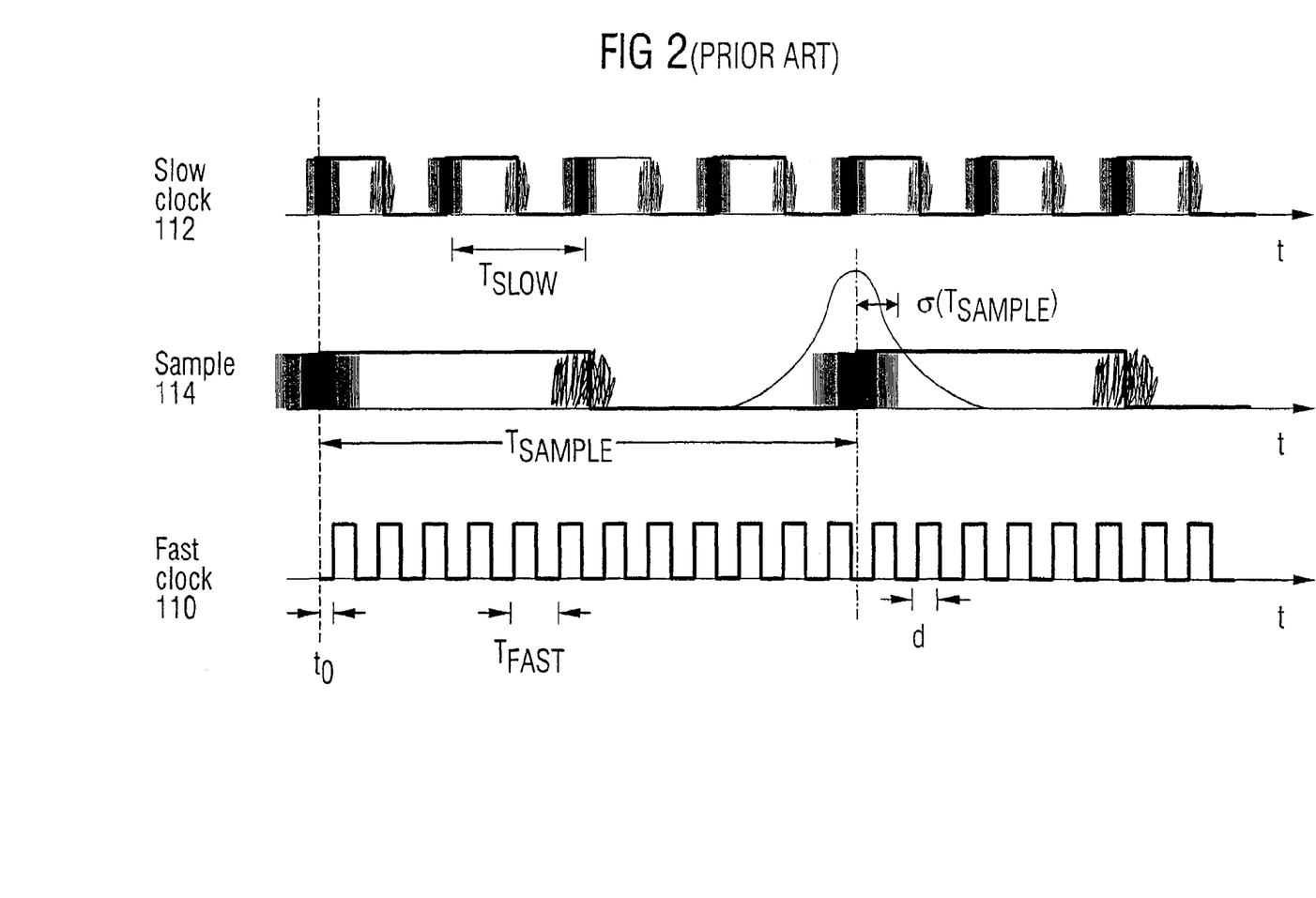
FIG. 2 shows a characteristic of signals of the random number generator source according to the prior art.

FIG. 2 shows characteristics of the fast clock signal 110, the slow clock signal 112 and the sample signal 114, as they are shown in FIG. 1. The fast clock signal 110 has a period $T_{FAST}$ and a duty cycle d. The slow clock signal 112 has a period $T_{SLOW}$. Edges of the slow clock signal 112 comprise a jitter. The sample signal 114 is generated from the slow clock signal 112 by prescaling the sample signal 112 by a factor defined in the prescaler. Here the slow clock signal 112 is prescaled by a factor of 4. As the sample signal 114 is generated from the slow clock signal 112, the edge of the sample signal 114 comprises a jitter, too. A period of the sample signal 114 is $T_{SAMPLE}$ and a standard deviation of the jitter of the sample signal 114 is $\sigma(T_{SAMPLE})$. Edges of the sample signal 114 and the fast clock signal 110 are not synchronized. Here the edge of the fast clock signal 110 occurs by a time period $t_0$ later than the edge of the sample signal 114. Frequency beating of the two free running oscillators 102, 104 (shown in FIG. 1) generates a non-white noise signal. This is especially a problem in a standard-cell based RNG where typically the jitter has a low intensity. Moreover, an unbalanced random bit stream 122 is obtained if the duty cycle d of the fast clock signal 110 is unbalanced. A relative jitter with respect to the fast clock signal is helpful.

The last cited technique, based on discrete-time chaotic maps exploits a sampling of a chaotic system to generate a random bit sequence. Non-linear or piece-wise linear systems can show a chaotic behavior under proper conditions for their internal parameters. Under chaotic conditions, two arbitrary close initial states lead to two completely different system evolutions. Therefore, the sources of randomness are the error or noise over the measurement of the initial state and the noise contribution during the state transitions. Unfortunately, when implementing a chaotic system in a physical device, environmental and process variations cause parameter variations that can force the system to leave its chaotic behavior thus evolving according to a periodic trajectory. Reference for chaotic-based true RNGs are in T. Stojanovski and L. Kocarev, "Chaos-based random number generators—Part I: Analysis", IEEE Trans. Circuits and Syst. I, vol. 48, no. 3, pp. 281-288, March 2001 and T. Stojanovski, J. Pihl, and L. Kocarev, "Chaos-based random number generators—Part II: Practical realization", IEEE Trans. Circuits and Syst. I, vol. 48, no. 3, pp. 382-385, March 2001.

Since different techniques feature different advantages, to increase the quality of the overall source, in C. S. Petrie, J. A. Connelly, "A noise-based IC random number generator for applications in cryptography", IEEE Trans. Circuits and Systems I, vol. 47, no. 5, pp. 615-621, May 2000 a true RNG which adopts a mixing of the three above mentioned RNG techniques is presented. A source quite resistant to deterministic disturbances is achieved even if, due to the mixing of different techniques, it is difficult to provide a statistical model for the system that allows to certify its operation. A more effective solution, a post-processing of the whole bit stream from the source with a carefully designed correcting or decorrelating algorithm, that features some compression too, can be employed. A lower speed bit stream with increased statistical quality is generated from a high-speed near-random input stream by selecting its entropy portions.

From the above, it follows, that every random source, even if well-designed, generates a bit stream that usually shows a certain level of correlation, among other, due to bandwidth limitation, fabrication tolerances, aging and temperature drifts or deterministic disturbances.

SUMMARY OF THE INVENTION

The present invention provides an apparatus for providing a high quality random bit stream.

The present invention provides an apparatus for providing a random bit stream, having:

a first provider for providing a clock signal, the clock signal periodically switching between a first state and a second state;

a second provider for providing a sample signal, the sample signal including a sampling edge;

an activator for activating the first and second providers such that the sampling edge is aligned to an edge of the clock signal;

a sampler for sampling the clock signal responsive to the sampling edge of the sample signal and for generating a random bit dependent on the sampled state of the clock signal;

a deactivator for deactivating the first and second providers responsive to the sampling edge; and a determiner for determining a mean value of successive random bits and for providing a control signal dependent on the mean value, wherein the activator includes a delay line for delaying a start signal for activating the first provider by a delay time, wherein the delay time is responsive to the control signal and wherein the delay time is configured for adjusting the alignment of the sampling edge to the edge of the clock signal, and wherein successive random bits form a random bit stream.

The present invention is based on the finding, that a synchronization of the sampling edge of the sample signal to an edge of the sampled clock signal allows a generation of a high quality random bit stream.

According to the inventive arrangement, the clock signal and the sample signal are synchronized by the means for activating the means for providing the clock signal and the means for providing the sample signal. This allows to obtain a good quality random bit stream even if the means for providing a clock signal and means for providing a sample signal feature a very small jitter level. Moreover, the whole system can be implemented in a completely digital design. This allows a more easy integrated implementation. Such an implementation can advantageously be used for a chip-card controller. The inventive approach further allows to provide a synchronized random bit stream by synchronizing the means for activating to a system clock. This allows to compensate for any disturbances of the system clock.

As the inventive apparatus for providing a random bit stream can be implemented by using just digital gates available in any standard-cell libraries without the need for any analog circuit, a shorter design time, higher yields and a higher portability on different technologies are achieved.

According to a preferred embodiment, the means for providing a clock signal and the means for providing a sample signal comprise a digital ring oscillator and the means for synchronization comprise a delay line, both being implementable by using digital gates.

According to a further preferred embodiment, the alignment of the sampling edge of the sample signal to the edge of the clock signal is adjusted by way of a feedback loop and delay lines. This allows to provide a balanced random bit stream even if the sample signal features a low jitter with respect to the clock signal. Further, the feedback loop allows a compensation of every asymmetry between the signal paths of the clock signal and the sample signal. Since the sampling is carried out around an edge of the clock signal, an unbalanced duty cycle of the clock signal does not effect the balancing of the provided random bit stream. Another advantage of the proposed invention is based on the means for deactivating the means for providing a clock signal and the means for providing a sample signal after generating a random bit which guarantees that there is no transition in the provided random bit stream due to a beating of the clock signal and the sample signal. This in turn, allows to use a transition counting as simple run-time test to detect the quality of the random bit stream as proposed in V. Bagini and M. Bucci, "A design of a reliable true random number generator for cryptographic applications", Proc. Workshop on Cryptographic Hardware Embedded Systems (CHES 99), Lecture Notes in Computer Science 1717, Springer-Verlag, Heidelberg, Germany, 1999, pp. 204-218 and in E. Trichina, M. Bucci, D. De Seta, and R. Luzzi, "Supplemental cryptographic hardware for Smart Cards", IEEE Micro, vol. 21, no. 6, pp. 26-35, Nov. 2001 and in NIST FIPS 140-2, Security requirements for cryptographic modules, May 2001.

BRIEF DESCRIPTION OF THE DRAWINGS

These and other objects and features of the present invention will become clear from the following description taken in conjunction with the accompanying drawing, in which.

DESCRIPTION OF PREFERRED EMBODIMENTS

Figure 3:
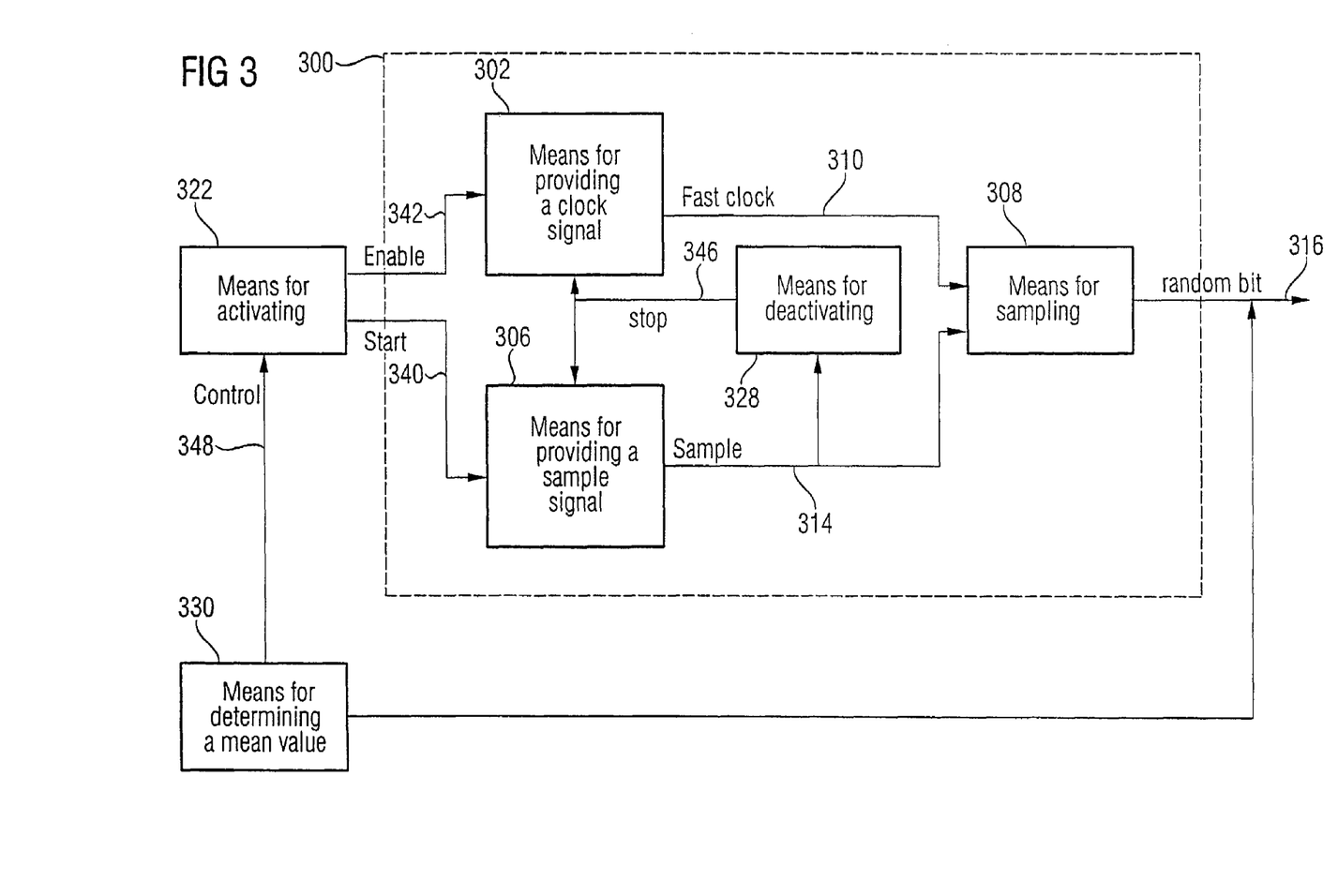
FIG. 3 shows a schematic view of an apparatus for providing a random bit stream according to the present invention.

FIG. 3 shows a schematic view of a preferred embodiment of a true random number generator, based on an apparatus 300 for providing a random bit stream according to the present invention. The apparatus 300 for providing a random bit stream comprises a means 302 for providing a clock signal, a means 306 for providing a sample signal and a means 308 for sampling. The means 302 for providing a clock signal generates a fast clock signal 310 which is connected to the means 308 for sampling. The means 306 for providing a sample signal generates a sample signal 314 which is connected to the means 308 for sampling. Responsive to the sample signal 314, the means 308 for sampling samples the fast clock signal 310 and outputs a random bit 316, dependent on the sampling result. Successive random bits 316 form a random bit stream.

The shown random number generator further comprises a means 322 for activating, a means 328 for deactivating and a means 330 for determining a mean value. The means 322 for activating controls the means 302 for providing a clock signal and the means 306 for providing a sample signal. The means 322 for activating outputs a start signal 340 and an enable signal 342. The start signal 340 is connected to the means 306 for providing a sample signal and the enable signal 342 is connected to the means 302 for providing a clock signal. The means 302, 306 start generating the fast clock signal 310 and the sample signal 314 responsive to the enable signal 342 and the start signal 340. The means 302 for providing a clock signal and the means 306 for providing a sample signal are deactivated by the means 328 for deactivating. Therefore, the means 328 for deactivating is connected to the sample signal 314. Responsive to the sample signal 314 the means 328 for deactivating generates a stop signal 346 which is connected to the means 302, 306. Responsive to the stop signal 346, the means 302, 306 stop generating the fast clock signal 310 and the sample signal 314.

According to a further embodiment the start signal 340 and the enable signal 342 can be adjusted. Therefore the means 330 for determining a mean value is connected to the random bit stream 316. The means 330 for determining a mean value determines a mean value of successive random bits 316. The means 330 outputs a control signal 348 which adjusts the means 322 for activating dependent on the determined mean value of successive random bits 316.

Figure 4:
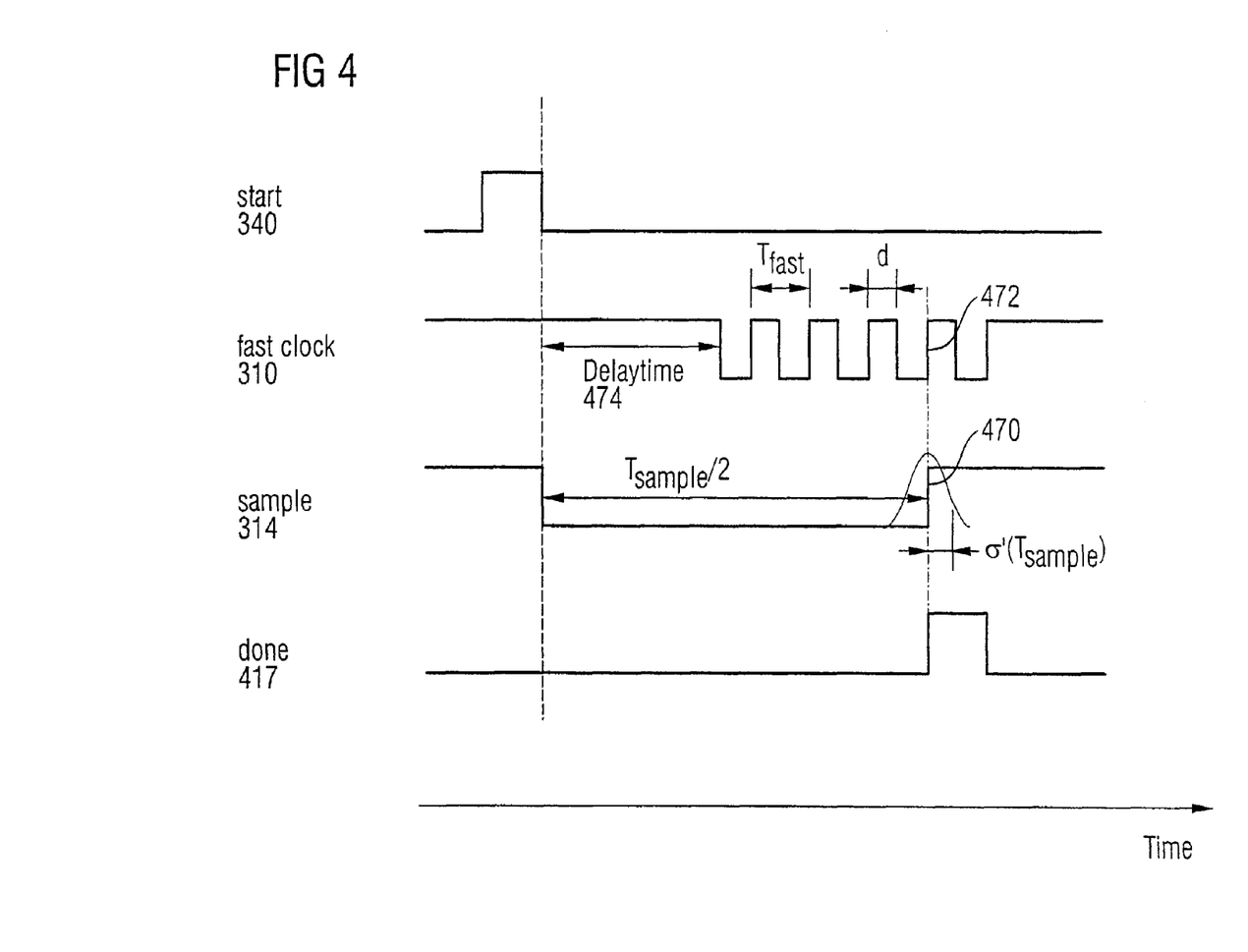
FIG. 4 shows a characteristic of signals of the apparatus for providing a random bit stream according to the present invention.
Figure 5:
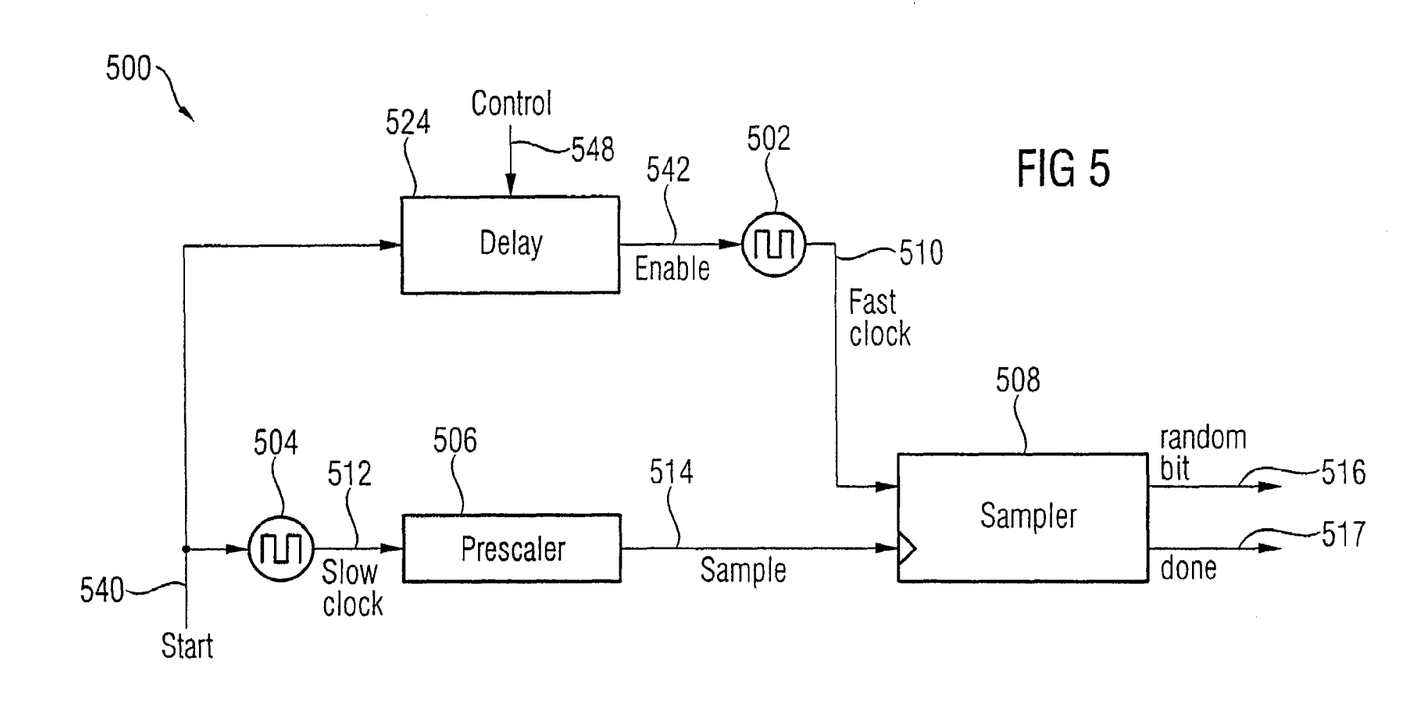
FIG. 5 shows a schematic view of an apparatus for providing a random bit stream according to a further embodiment of the present invention.
Figure 6:
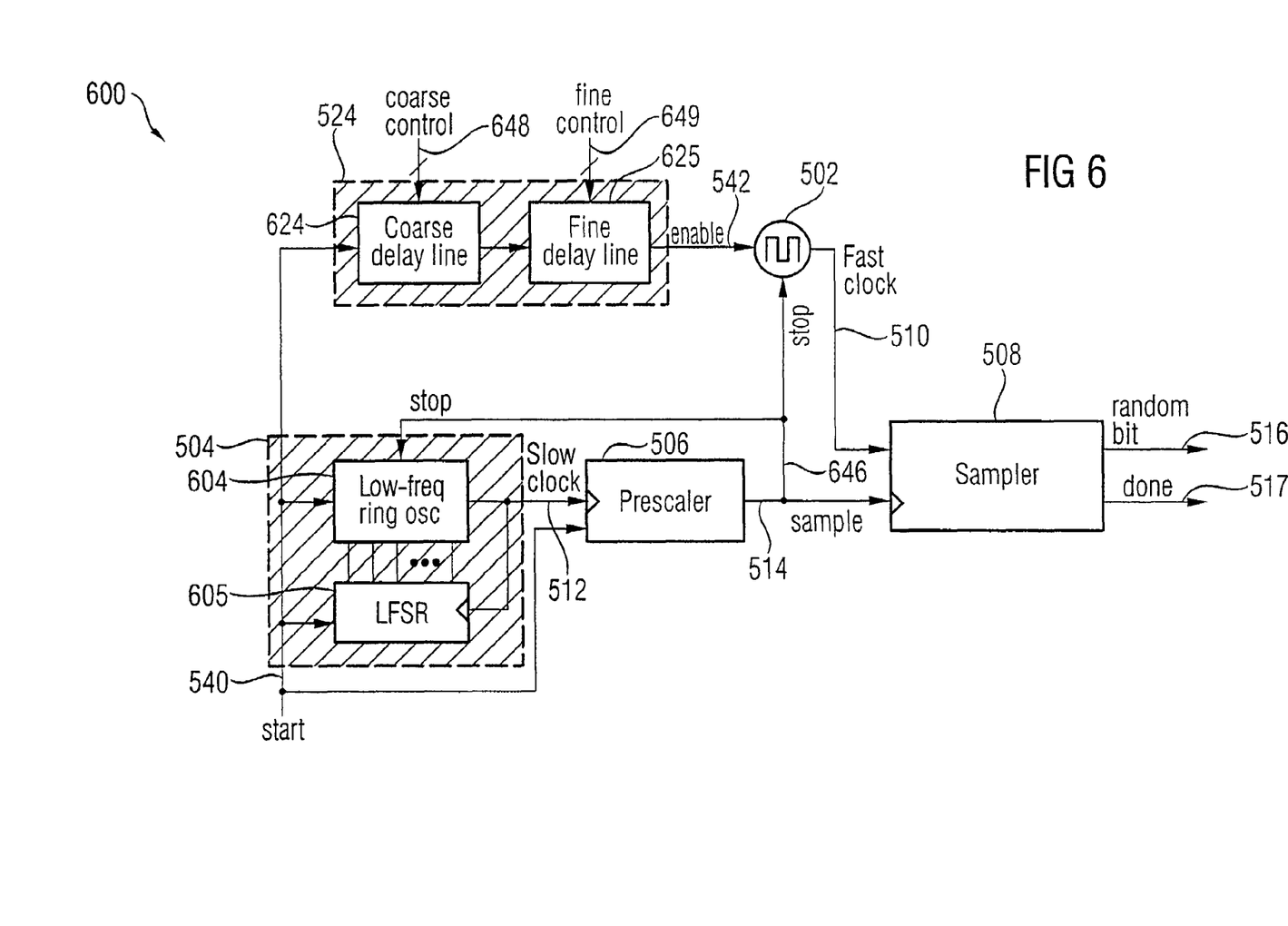
FIG. 6 shows a schematic view of an apparatus for providing a random bit stream according to a further embodiment of the present invention.
Figure 7:
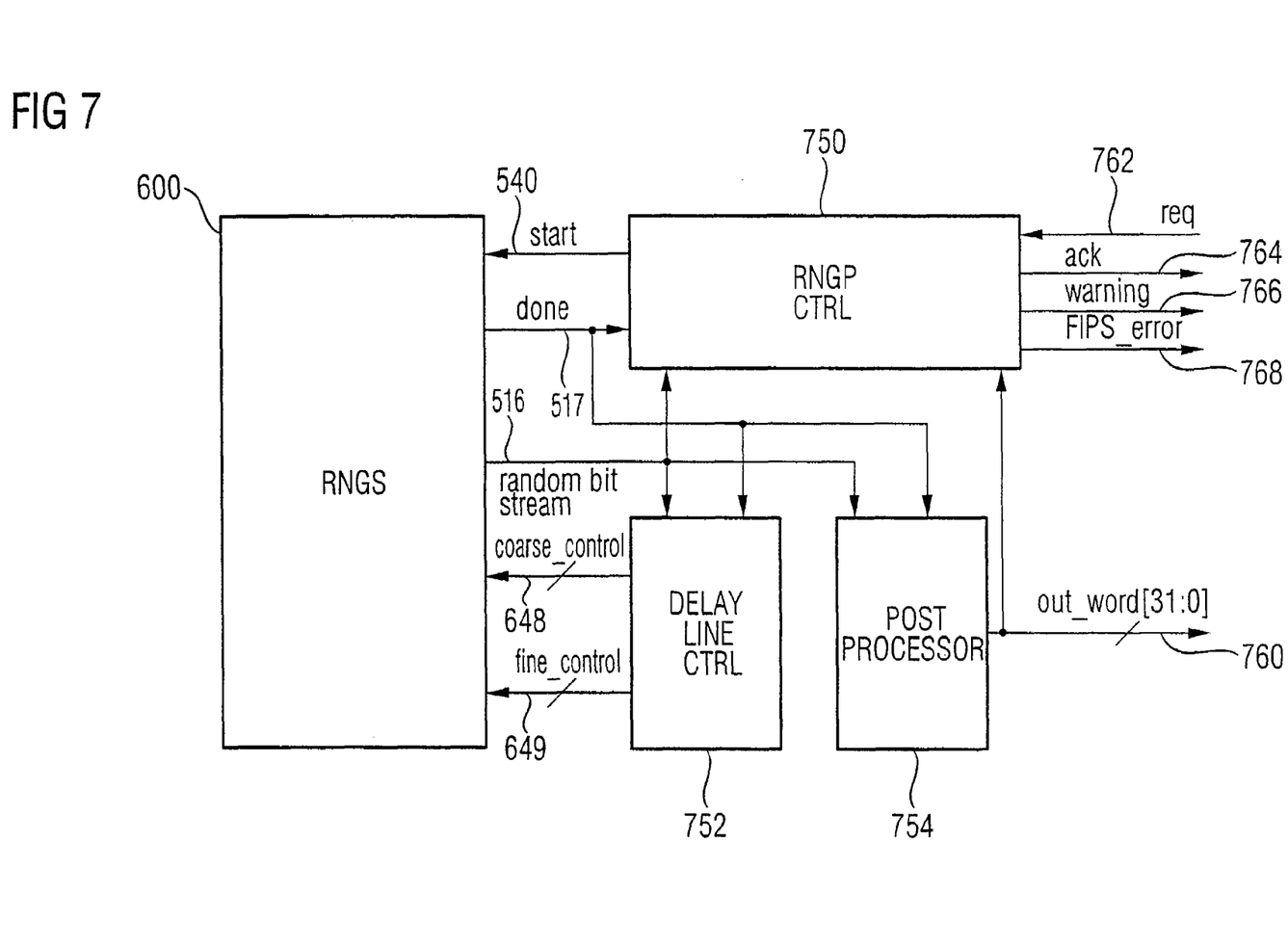
FIG. 7 shows a schematic view of a random number generator based on an apparatus for providing a random bit stream according to the present invention.

FIG. 4 shows characteristics of the start signal 340, the fast clock signal 310 and the sample signal 314 as they are shown in FIG. 3, and a done signal as it shown in FIG. 5 to 7. As can be seen from FIG. 4, the sample signal 314 is responsive to the start signal 314. The sample signal 314 has a time period of $T_{SAMPLE}$. After a half time period $T_{SAMPLE}/2$ a sampling edge 470 occurs. The sampling edge 470 which is a first rising edge of the sample signal 314 is aligned to an edge 472 of the fast clock signal 310 which periodically switches between a first state and a second state. The alignment of the sampling edge 470 and the edge 472 of the fast clock signal 310 is achieved by a delay time 474. The delay time 472 is controlled by the means 322 for activating (shown in FIG. 3) and is the time, the means 302 for providing a clock signal is activated after the means 306 for processing a sample signal. Thus, an alignment of the edges 470, 472 is achieved.

The alignment of the sampling edge 470 and the edge 472 of the clock signal avoids frequency beating and maximizes the random bit stream data quality, especially in presence of a low-jittered sampling clock signal. Also, an unbalance duty cycle d does not affect a balancing of the generated random bit stream 316 (shown in FIG. 3). The done signal 417 is activated responsive to the sampling edge 470 and indicates a generation of a random bit 316.

FIG. 5 shows a further preferred embodiment of an apparatus for providing a random bit stream. The apparatus 500 for providing a random bit stream comprises a means for providing a clock signal formed by a high-frequency ring oscillator 502, a means for providing a sample signal formed by a low-frequency ring oscillator 504 and a configurable prescaler 506, a means for sampling formed by a sampling element or sampler 508. The high-frequency oscillator 502 generates a fast clock signal 510, like the fast clock signal 310 shown in FIG. 4. The fast clock signal 510 is connected to the sampler 508. The low frequency oscillator 504 generates a slow clock signal 512, like the slow clock signal 112 shown in FIG. 2. The slow clock signal 512 is connected to the prescaler 506. The prescaler 506 prescales the slow clock signal 512 and outputs a sample signal 514, like the sample signal 314 shown in FIG. 4. The sample signal 514 is connected to the sampler 508. The sampler 508 samples the fast clock signal 510 responsive to the sampling edge of the sample signal 514. Corresponding to a sampling result, the sampler 508 outputs a random bit 516 and a done signal 517. The done signal 517 indicates a generation of a new random bit 516 and is used to deactivate the oscillators 502, 504. The apparatus 500 further comprises a means 524 for delaying a start signal 540 and outputting an enable signal 542. The means 524 for delaying is part of the means 322 for activating as shown in FIG. 3. The start signal 540 activates the low-frequency oscillator 504. The enable signal 542 activates the high-frequency oscillator 502. The means 524 for delaying delays the start signal 540 by a delay time as shown in FIG. 4, thus aligning the sampling edge and an edge of the fast clock signal 510. The means 524 for delaying is responsive to a control signal 548.

The control signal 548 is part of a feedback loop, as described in FIG. 3, for synchronizing the sampling edge of the sample signal to an edge of the fast clock signal. As a consequence, the random bit stream formed of successive random bits 516 is balanced even if the low-frequency oscillator 504 and the prescaler 506 feature a low jitter with respect to a period of the fast clock signal 510.

A prescaling factor of the prescaler 506 can be adjusted in order to adjust the standard deviation σ' ($T_{SAMPLE}$) of the jitter of the sampling edge.

FIG. 6 shows a schematic view of a further embodiment of an apparatus 600 for providing a random bit stream. Elements already shown and described in FIG. 5 are marked with the same reference numbers and not described hereinafter. In this embodiment, the low-frequency ring oscillator 504 comprises a low-frequency ring oscillator 604 and a linear feedback shift register 605 (LFSR; LFSR=linear feedback shift register). The low-frequency ring oscillator 604 and the LFSR 605 are connected to the start signal 540. For the LFSR 605, the start signal 540 is a reset signal. The LFSR 605 is connected to and clocked by the slow clock signal 512. The LFSR 605 is connected to the low-frequency ring oscillator 604 to disturb a mean period of the low-frequency ring oscillator 604.

The means 524 for delaying the start signal 514 comprises a first delay line 624 and a second delay line 625. The first delay line 624 is a coarse delay line and the second delay line 625 is a fine delay line. To adjust the two delay lines 624, 625, the control signal 548 as it is shown in FIG. 5 comprises a coarse control signal 648 and a fine control signal 649.

In this embodiment, a means for deactivating is formed by a stop signal 646. The stop signal 646 is equal to the sample signal 514 and is connected to the high-frequency oscillator 502 and the low-frequency oscillator 604. In order to synchronize the sampling edge of the sample signal 514 and an edge of the fast clock signal 510, the oscillators 502, 604 are stopped after every sampling step and started again according to an external command provided by the start signal 540. The fast ring oscillator 502 starts after a delay time with respect to the low-frequency ring oscillator. As described in FIG. 3, the delay time can be adjusted by a feedback loop according to a mean value of the random bit 516 output stream, thus obtaining an edge synchronization. The delay time is adjusted by the coarse delay line 624 which is controlled by the coarse control signal 648 and the fine delay line 625 which is controlled by the fine control signal 649. The adjustable means 524 for delaying is implemented with two different grained delay lines 624, 625 in order to speed up the transient response of the feedback loop. The feedback loop compensates for every asymmetry between the signal path of the fast clock signal 510 and the signal path of the slow clock signal 512 and the sample signal 514 from the start signal 540 to the sampler 508, including wire propagation delay times and a sampler setup time.

To avoid a synchronization of the low-frequency oscillator 604 with a periodic disturbance, a pseudo-random scrambling of the mean period of the slow clock signal 512 is employed. Therefore, the low-frequency oscillator 504 includes the LFSR 605 to implement a pseudo-random scrambling, thus avoiding a synchronization with a periodic disturbance. At the beginning of a new generation cycle, responsive to the start signal 540, the LFSR 605 starts again from its reset value. Thus, the same pseudo-random sequence is repeated every time the apparatus 600 starts to generate a new random bit 516. As a consequence, after the prescaler 506, a variation in the period of the sample signal 514 is due to a jitter of the low-frequency oscillator 604 itself and no pseudo-random modulation is visible, thus addressing the synchronization issue without introducing any artificial pseudo-randomness in the random bit stream 516.

In the embodiments described above, the low-frequency oscillators are enabled on the falling edge of a starting pulse of the start signal and the fast oscillators are enabled after a delay which is adjusted by a feedback loop. After a sampling of the clock signal on a first rising edge of the sampling signal, a done pulse is generated, both oscillators are stopped and a new cycle can start again. Alternatively to the done signal, the oscillators are connected to the sample signal and are deactivated by the sample edge. It is notable that, being the starting pulse synchronous with the system clock, the random bit generation will be synchronous too. As a consequence, any disturbance from the clock is the same during every generation cycle and is compensated by the feedback loop. It is clear, that the described signals can have different characteristics concerning duty cycles and transitions.

FIG. 7 shows a top-level architecture of a true random number generator which employs the proposed apparatus 600 for providing a random bit source as shown in FIG. 6. The true random number generator comprises four main functional blocks, including the apparatus 600 for providing a random bit stream, a top-level controller (RNGP CTRL) 750, a delay line controller 752 and a post processing register 754. The post processing register 754 is connected to the random bit stream 516 formed by successive random bits generated by the apparatus 600 and the done signal 517 and outputs a 32 bit wide random bit output word 760. The delay line controller 752 is connected to the random bit stream 516 and the done signal 517 and generates the coarse control signal 648 and the fine control signal 649. The top-level controller 750 is connected to the done signal 517, the random bit stream 516 and the output signal 760. Moreover, the top-level controller 750 inputs a request signal 762, and outputs an acknowledgment signal 764, a warning signal 766 and an error signal 768.

When a request for a new random word 760 is received via the request signal 762, random bits 516 are generated by the apparatus 600 and processed by the post processing register 754. The top-level controller 750 controls the generation of random bits 516, by the start signal 540 until a desired transition number on the random bit stream 516 is reached. Then the acknowledge signal 764 is raised, or, if too few transitions are detected after a maximum compression ratio the warning signal 766 is activated. Therefore, a compression ratio of the random bit stream is dynamically changed according to a statistical quality of the random bit stream 516. Such an adaptive post-processing of the random bit stream 516 is a further advantage of the proposed apparatus 600 for providing a random bit stream.

In the above embodiments, a chain of inverters or a chain of buffers can be used instead of a delay line. According to a further embodiment, the second means is arranged to be controllable with respect to a sampling frequency so that a trade off between a throughput and a random number quality is obtainable. This allows to adopt the apparatus for providing a random bit stream to different applications.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for providing a random bit stream, comprising:
   a first provider for providing a clock signal, the clock signal periodically switching between a first state and a second state;
   a second provider for providing a sample signal, the sample signal comprising a sampling edge;
   an activator for activating the first and second providers such that the sampling edge is aligned to an edge of the clock signal;
   a sampler for sampling the clock signal responsive to the sampling edge of the sample signal and for generating a random bit dependent on the sampled state of the clock signal;
   a deactivator for deactivating the first and second providers responsive to the sampling edge; and
   a determiner for determining a mean value of successive random bits and for providing a control signal dependent on the mean value,
   wherein the activator comprises a delay line for delaying a start signal for activating the first provider by a delay time, wherein the delay time is responsive to the control signal and wherein the delay time is configured for adjusting the alignment of the sampling edge to the edge of the clock signal, and
   wherein successive random bits form a random bit stream.

2. The apparatus according to claim 1, wherein the first provider is a first oscillator.

3. The apparatus according to claim 1, wherein the second provider comprises a second oscillator for generating a further clock signal and a prescaler for prescaling the further clock signal and for generating the sample signal.

4. The apparatus according to claim 3, wherein the second oscillator comprises a scrambler for scrambling a mean period of the further clock signal.

5. The apparatus according to claim 1, wherein the sampling edge of the sample signal is jittered and a jitter standard deviation σ' of the sampling edge is smaller than a period of the clock signal.

6. The apparatus according to claim 3, wherein the first and second oscillators are ring oscillators.

7. A true random number generator comprising:
   the apparatus for providing a random bit stream as claimed in claim 1; and
   a post-processor for post-processing the random bit stream and for generating a warning signal dependent on a statistical quality of the random bit stream.

8. The apparatus according to claim 1, implemented in digital gates.

9. An apparatus for providing a random bit stream comprising:
   a first providing means for providing a clock signal;
   a second providing means for providing a sample signal;
   an activation means for activating the first and second providing means such that a sampling edge of the sample signal is aligned to an edge of the clock signal;
   a sampling means for sampling the clock signal responsive to the sampling edge of the sample signal and for generating a random bit dependent on the sampled state of the clock signal;
   a deactivating means for deactivating the first and second providers; and
   a determining means for determining a mean value of successive random bits and for providing a control signal dependent on the mean value,
   wherein the activating means comprises a delay means for delaying a start signal for activating the first providing means by a delay time, wherein the delay time is responsive to the control signal and wherein the delay time is configured for adjusting the alignment of the sampling edge to the edge of the clock signal, and
   wherein successive random bits form a random bit stream.

10. The apparatus according to claim 9, wherein the second providing means comprises a second oscillating means for generating a further clock signal and a prescaling means for prescaling the further clock signal and for generating the sample signal.

11. The apparatus according to claim 10, wherein the second oscillating means comprises a scrambling means for scrambling a mean period of the further clock signal.

12. A true random number generator comprising:
   the apparatus for providing a random bit stream as claimed in claim 9; and
   a post-processing means for post-processing the random bit stream and for generating a warning signal dependent on a statistical quality of the random bit stream.

* * * * *